United States Patent
Gorin et al.

(10) Patent No.: US 12,435,225 B2
(45) Date of Patent: Oct. 7, 2025

(54) COATING COMPOSITION, A COATED FABRIC, A METHOD OF MAKING A COATED FABRIC, AND AN ARTICLE MADE FROM THE COATED FABRIC

(71) Applicants: Dow Global Technologies LLC, Midland, MI (US); Dow Silicones Corporation, Midland, MI (US)

(72) Inventors: Craig Gorin, Midland, MI (US); David Malotky, Midland, MI (US); Manesh Sekharan, Freeport, TX (US); Thomas Tomczak, Midland, MI (US); Kevin Bouck, Broomfield, CO (US); Daniel Dermody, Midland, MI (US); David Bank, Midland, MI (US); Jacob Milne, Rock Hill, SC (US); Mark Fisher, Midland, MI (US)

(73) Assignees: Dow Silicones Corporation, Midland, MI (US); Dow Global Technologies LLC, Midland, MI (US)

(*) Notice: Subject to any disclaimer, the term of this patent is extended or adjusted under 35 U.S.C. 154(b) by 942 days.

(21) Appl. No.: 17/281,274

(22) PCT Filed: Oct. 8, 2019

(86) PCT No.: PCT/US2019/055078
§ 371 (c)(1),
(2) Date: Mar. 30, 2021

(87) PCT Pub. No.: WO2020/081278
PCT Pub. Date: Apr. 23, 2020

(65) Prior Publication Data
US 2022/0002565 A1    Jan. 6, 2022

Related U.S. Application Data

(60) Provisional application No. 62/746,580, filed on Oct. 17, 2018.

(51) Int. Cl.
C09D 7/45        (2018.01)
B60R 21/00       (2006.01)
(Continued)

(52) U.S. Cl.
CPC ............. *C09D 7/45* (2018.01); *C09D 123/06* (2013.01); *C09D 123/16* (2013.01);
(Continued)

(58) Field of Classification Search
CPC .. C08L 23/0815; C08L 23/0869; C08L 33/02; C08L 51/06; C09D 123/04;
(Continued)

(56) References Cited

U.S. PATENT DOCUMENTS 3,645,992 A    2/1972  Elston
4,076,698 A    2/1978  Anderson et al.
(Continued)

FOREIGN PATENT DOCUMENTS

CA    2133948        4/1995
CN    101772549 A    7/2010
(Continued)

OTHER PUBLICATIONS

Chinese Office Action received May 3, 2023; from counterpart Chinese Application No. 201980060742.4.

*Primary Examiner* — Lynda Salvatore
(74) *Attorney, Agent, or Firm* — Warner Norcross + Judd LLP (57) ABSTRACT

A coating composition which comprises a dispersion which is a melt blended product of one or more olefinic base polymers; one or more dispersants; one or more compatibilizers; water; and optionally base; wherein the dispersion exhibits an average volume mean particle size diameter of less than or equal to 2 microns, a solids content of equal to or less than 70 wt %, and a pH of 8 or greater; one or more (Continued)

rheology modifiers; and optionally one or more neutralizing agents is provided. An article coated with the coating composition and a method of making the coated article are also provided.

14 Claims, 1 Drawing Sheet (51) Int. Cl.
  *B60R 21/235* (2006.01)
  *C09D 123/06* (2006.01)
  *C09D 123/16* (2006.01)
  *C09D 153/00* (2006.01)
  *D06M 15/227* (2006.01)
  *D06M 101/32* (2006.01)

(52) U.S. Cl.
  CPC ......... *C09D 153/00* (2013.01); *D06M 15/227* (2013.01); *B60R 2021/0006* (2013.01); *B60R 21/235* (2013.01); *D06M 2101/32* (2013.01)

(58) Field of Classification Search
  CPC .. C09D 123/06; C09D 123/14; C09D 123/16; C09D 153/00; C09D 7/45; D06M 15/227; D06M 2101/32
  See application file for complete search history.

(56) References Cited

U.S. PATENT DOCUMENTS

| | | | |
|---|---|---|---|
| 4,599,392 A | 7/1986 | McKinney et al. | |
| 4,988,781 A | 1/1991 | McKinney et al. | |
| 5,272,236 A | 12/1993 | Lai et al. | |
| 5,278,272 A | 1/1994 | Lai et al. | |
| 5,504,172 A | 4/1996 | Imuta et al. | |
| 5,539,021 A | 7/1996 | Pate et al. | |
| 5,574,091 A | 11/1996 | Walther et al. | |
| 5,756,659 A | 5/1998 | Hughes et al. | |
| 5,798,410 A | 8/1998 | Walther et al. | |
| 5,938,437 A | 8/1999 | DeVincenzo | |
| 6,455,636 B2 | 9/2002 | Sanada | |
| 6,525,157 B2 | 2/2003 | Cozewith et al. | |
| 6,960,635 B2 | 11/2005 | Stevens et al. | |
| 7,608,668 B2 | 10/2009 | Li Pi Shan et al. | |
| 7,763,676 B2 | 7/2010 | Moncla et al. | |
| 7,935,755 B2 | 5/2011 | Moncla et al. | |
| 9,145,498 B2 | 9/2015 | Ultsch | |
| 2013/0059165 A1* | 3/2013 | Malotky | C08L 51/003 524/576 |

FOREIGN PATENT DOCUMENTS

| | | |
|---|---|---|
| CN | 102985484 A | 3/2013 |
| CN | 103003352 A | 3/2013 |
| CN | 103502354 A | 1/2014 |
| CN | 104159966 A | 11/2014 |
| CN | 107429106 A | 12/2017 |
| EP | 2569368 | 3/2013 |
| JP | 04983246 B2 | 7/2012 |
| JP | 2017025318 A | 2/2017 |
| WO | 0001745 | 1/2000 |
| WO | WO2009023131 | 2/2009 |
| WO | 2010042334 | 4/2010 |
| WO | 2016160228 | 10/2016 |

* cited by examiner

COATING COMPOSITION, A COATED FABRIC, A METHOD OF MAKING A COATED FABRIC, AND AN ARTICLE MADE FROM THE COATED FABRIC

CROSS-REFERENCE TO RELATED APPLICATIONS

This application is a 371 Application which claims the benefit of PCT/US2019/055078, filed Oct. 8, 2019, which claimed the benefit of U.S. Provisional Application No. 62/746,580, filed Oct. 17, 2018, both of which are hereby incorporated herein by reference in their entirety.

FIELD OF INVENTION

The instant invention relates to a coating composition, a coated fabric, a method of making a coated fabric, and an article made from the coated fabric.

BACKGROUND OF THE INVENTION

Polymer coatings on fabric, primarily polyester and nylon, are used for gas/air pressure retention applications, such as in automotive airbags and aircraft emergency chutes. Silicone coatings are predominant in the market, although organic coatings coating have entered the market due to lower cost. Issues exist with the known coatings including cost, blocking (the tendency of polymer coated surfaces to stick to each other), flammability, high coat weight, and loss of gas pressure over periods greater than a few seconds. Pressure retention coatings optimizing all of these factors would be useful in such applications.

SUMMARY OF THE INVENTION

The instant invention provides a coating composition, a coated fabric, a method of making a coated fabric, and an article made from the coated fabric. The invention further provides articles, such as air bags and emergency chutes, made from the coated fabric.

In one embodiment, the present invention provides a coating composition comprising: (1) a dispersion comprising a melt kneaded product of: (a) from 50 to 98 wt %, based on the total solids weight of the dispersion, of one or more olefinic base polymers; (b) from 2 to 40 wt %, based on the total solids weight of the dispersion, of one or more dispersants; (c) from 0 to 15 wt %, based on the total solids weight of the dispersion, of one or more compatibilizers; (d) water; and (e) optionally, sufficient neutralizing agent to neutralize the one or more dispersants from 100 to 140% of an acid value of the one or more dispersants; wherein the dispersion exhibits a volume mean particle size of less than or equal to 2 microns, a solids content of equal to or less than 70 wt %, and a pH of 8 or greater; (2) one or more rheology modifiers; and (3) sufficient neutralizing agent such that the coating composition has a pH of greater than 7.

In an alternative embodiment, the present invention provides a coated fabric for use in airbags, comprising: (1) a woven or nonwoven substrate; (2) a coating derived from the inventive coating composition, wherein the coating is applied to at least one surface of the substrate at a total coating weight of from 20 to 50 g/m².

In another alternative embodiment, the present invention provides an article comprising the inventive coated fabric.

In another alternative, the present invention provides a method of preparing a coated fabric comprising: providing a woven or nonwoven substrate; applying a coating composition to at least one surface of the substrate by one or more application method selected from the group consisting of knife coating, roll coating, dip coating, flow coating, squeeze coating, and spray coating to produce a wet coated substrate; and drying the wet coated substrate to produce a coated fabric exhibiting a coating weight of 20 to 50 g/m².

DETAILED DESCRIPTION OF THE INVENTION

The instant invention provides a coating composition, a coated fabric and articles made therefrom, and a method of making a coated fabric.

The coating composition according to the present invention comprises (a) a dispersion, (b) a rheology modifier, (c) optionally, a base, and (d) optionally, a solvent. The dispersion comprises one or more olefinic base polymers, one or more dispersing agents, optionally, one or more compatibilizers, water and optionally, one or more neutralizing agents.

Base Polymer

The dispersion of the present invention comprises from 50 to 98 percent by weight of base polymer(s), based on the total weight of the solid content of the dispersion. All individual values and subranges from 50 to 98 weight percent are included herein and disclosed herein; for example, the weight percent can be from a lower limit of 50, 55, 60, 65, 70, 75, 80, 82, 90, or 92 weight percent to an upper limit of 65, 74, 83, 87, 90, 95, or 98 weight percent. For example, the dispersion may comprise from 50 to 98, or in the alternative from 75 to 95, or in the alternative from 60 to 85 percent by weight of base polymer(s), based on the total weight of the solid content of the dispersion. The dispersion comprises at least one or more olefinic base polymers. The olefinic base polymer may, for example, be selected from the group consisting of a thermoplastic material, and a thermoset material. The one or more base polymers comprise one or more olefin-based polymers.

Examples of thermoplastic materials include, but are not limited to, homopolymers and copolymers (including elastomers) of an alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer.

In selected embodiments, the olefinic base polymer comprises a polyolefin selected from the group consisting of ethylene-alpha olefin copolymers, and propylene-alpha olefin copolymers. In particular, in select embodiments, the base polymer comprises one or more non-polar polyolefins.

In some embodiments, preferred olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE).

In one embodiment, the base polymer is a propylene-based copolymer or interpolymer. In some particular embodiments, the propylene/ethylene copolymer or interpolymer is characterized as having substantially isotactic propylene sequences. The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by 13C NMR spectra. Such propylene based copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

In one embodiment, the olefinic base polymer may have a density from 0.86 to 0.96 g/cc and a melt index, $I_2$, from 1 to 50 g/10 minutes.

In certain embodiments, the base polymer may be a propylene-ethylene copolymer or interpolymer having an ethylene content between 5 and 20 percent by weight and a melt flow rate (230° C. with 2.16 kg weight) from 0.5 to 300 g/10 min. In other embodiments, the propylene-ethylene copolymer or interpolymer may have an ethylene content between 9 and 12 percent by weight and a melt flow rate (230° C. with 2.16 kg weight) from 1 to 100 g/10 min.

In other embodiments, the base polymer may have a crystallinity of less than 50 percent. In other embodiments, the crystallinity of the base polymer may be from 5 to 35 percent. In other embodiments, the crystallinity may range from 7 to 20 percent.

In certain other embodiments, the base polymer is a semi-crystalline polymer and may have a melting point of less than 110° C. In some embodiments, the melting point may be from 25 to 100° C. In yet other embodiments, the melting point may be between 40 and 85° C.

In other selected embodiments, olefin block copolymers, e.g., ethylene multi-block copolymer, such as those described in the U.S. patent application Ser. No. 11/376,835 may be used as the base polymer. Nonlimiting examples of suitable ethylene/α-olefin multi-block copolymer are disclosed in U.S. Pat. No. 7,608,668, the disclosure of which is incorporated by reference herein. In an embodiment, the ethylene/α-olefin multi-block copolymer is an ethylene/octene multi-block copolymer. The ethylene/octene multi-block copolymer is sold under the tradename INFUSE™ available from The Dow Chemical Company. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:
$T_m > -2002.9 + 4538.5(d) - 2422.2(d)^2$; or (b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:
ΔT > −0.1299(ΔH) + 62.81 for ΔH greater than zero and up to 130 J/g,
ΔT ≥ 48° C. for ΔH greater than 130 J/g,
wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:
Re > 1481 − 1629(d); or (d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

The ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the olefinic base polymer comprises a polar polymer, having a polar group as either a comonomer or grafted monomer. In exemplary embodiments, the olefinic base polymer comprises one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™ commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary olefinic base polymers include, but are not limited to, ethylene ethyl acrylate (EEA) copolymer, ethylene methyl methacrylate (EMMA), and ethylene butyl acrylate (EBA).

In one embodiment, the olefinic base polymer comprises a polar polyolefin selected from the group consisting of ethylene-acrylic acid (EAA) copolymer, ethylene-methacrylic acid copolymer, and combinations thereof.

Those having ordinary skill in the art will recognize that the above list is a non-comprehensive listing of exemplary base polymers. It will be appreciated that the scope of the present invention is restricted by the claims only.

Dispersant and Neutralizing Agent

The dispersion of the instant invention comprises 2 to 40 percent by weight of one or more dispersants, based on the total weight of the solid content of the dispersion. All individual values and subranges from 2 to 40 weight percent are included herein and disclosed herein; for example, the dispersants can range from a lower limit of 2, 7, 12, 17, 22, or 25 weight percent to an upper limit of 15, 20, 25, 30, or 40 weight percent. For example, the dispersion may comprise from 2 to 40, or in the alternative from 5 to 30, or in the alternative from 10 to 34, or in the alternative from 15 to 40 percent by weight of one or more dispersants, based on the total weight of the solid content of the dispersion.

The dispersant may preferably be an external stabilizing agent. In selected embodiments, the dispersant may be a surfactant, a polymer, or mixtures thereof. In one embodiment, the dispersant is selected from the group consisting of long chain carboxylic acids and acrylic dispersants. In another embodiment, the dispersant is selected from ethylene oxide-based non-ionic surfactants. In certain embodiments, the dispersant can be a polar polymer, having a polar group as either a comonomer or grafted monomer. In exemplary embodiments, the dispersant comprises one or more polar polyolefins, having a polar group as either a comonomer or grafted monomer or functional group. In an embodiment the dispersant is an acrylic dispersant. An "acrylic dispersant" is an acrylic-monomer containing material that promotes the formation and stabilization of a dispersion. Nonlimiting examples of suitable acrylic monomers for use in acrylic dispersants include alkyl (meth)acrylates, ethyl hexylacrylate (2-EHA), and combinations thereof. Nonlimiting examples of suitable monomer include nonionic copolymerized monoethylenically unsaturated monomers such as (meth)acrylic ester monomer including methyl (meth)acrylate (MMA), ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureidofunctional (meth)acrylates and acetoacetates, acetamides or cyanoacetates of (meth)acrylic acid; styrene or substituted styrenes; vinyl toluene; monoethylenically unsaturated acetophenone or benzophenone derivatives; vinyl acetate or other vinyl esters; vinyl monomers such as vinyl chloride, vinylidene chloride, N-vinyl pyrollidone; and (meth)acrylonitrile. The term "(meth)" followed by another term such as (meth)acrylate refers to both acrylates and methacrylates. In an embodiment, the acrylic dispersant contains at least one acrylic monomer and a carboxylic acid comonomer. Nonlimiting examples of suitable carboxylic acid comonomers include acrylic acid, methacrylic acid, crotonic acid, itaconic acid, fumaric acid, maleic acid, monomethyl itaconate, monomethyl fumarate, monobutyl fumarate, and maleic anhydride. In an embodiment, the acrylic dispersant is an alkyl (meth)acrylate/carboxylic acid interpolymer. In a further embodiment, the acrylic dispersant is a 2-EHA/alkyl (meth)acrylate/carboxylic acid terpolymer.

Exemplary acrylic dispersants further include, but are not limited to, ethylene-acrylic acid (EAA) and ethylene-methacrylic acid copolymers, such as those available under the trademarks PRIMACOR, commercially available from The Dow Chemical Company, NUCREL, commercially available from E.I. DuPont de Nemours, and ESCOR, commercially available from ExxonMobil Chemical Company and described in U.S. Pat. Nos. 4,599,392, 4,988,781, and 5,938,437, each of which is incorporated herein by reference in its entirety. Other exemplary polymeric dispersants include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

In one embodiment, the acrylic dispersant is ethylene-free.

In another embodiment, the acrylic dispersant is an ethylhexyl acrylate/methyl methacrylate (MMA)/methacrylic acid terpolymer.

Other dispersants that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The dispersants may be partially or fully neutralized with a neutralizing agent. In certain embodiments, neutralization of the dispersants, such as a long chain fatty acid or EAA, may be from 100 to 140 percent on a molar basis; or in the alternative, from 100 to 120 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, MI). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional dispersing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Dispersants useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof.

Various commercially available surfactants may be used as dispersants in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Michigan.

Additional Dispersion Components

The dispersion further comprises water. The dispersion of the instant invention comprises 35 to 90 percent by volume of water, based on the total volume of the dispersion. In particular embodiments, the water content may be in the range of from 35 to 90, or in the alternative from 35 to 65, or in the alternative from 45 to 55 percent by volume, or in the alternative from 50 to 90 percent by volume, based on the total volume of the dispersion. Water content of the dispersion may preferably be controlled so that the solids content (base polymer plus dispersant plus optional compatibilizer) is between about 1 percent to about 74 percent by volume. In particular embodiments, the solids range may be between about 10 percent to about 70 percent by volume. In other particular embodiments, the solids range is between about 20 percent to about 60 percent by volume. In certain other embodiments, the solids range is between about 30 percent to about 55 percent by volume.

The dispersion may optionally further include other additives. For example, additives may include compatibilizers, wetting agent, surfactants (added following formation of the dispersion), anti-static agents, antifoam agent, anti-block agents, wax-dispersion pigments, a neutralizing agent, fire retardants, a thickener, a brightener, a rheology modifier, a biocide, a fungicide, a shear stabilizer, a UV stabilizer, a coefficient of friction modifier, and other additives known to those skilled in the art. While optional for purposes of the present invention, other components may be highly advantageous for product stability during and after the manufacturing process.

Compatibilizers may include those previously described in the art such as maleated waxes and may be present in amounts from 0 to 15 wt % of the dispersion, based on the total solids weight of the dispersion.

The dispersion used in the invention exhibits an average volume mean particle size diameter of less than or equal to 2 microns. All individual particle size diameters of less than or equal to 2 microns are included and disclosed herein. For example, the average volume mean particle size diameter of the dispersion may have an upper limit of 2, 1, 0.5, or 0.25 microns. For example, the average volume mean particle size diameter may range from 0.1 to 2 microns, or in the alternative, from 0.5 to 2 microns, or in the alternative, from 0.1 to 1 micron.

The dispersion used in the invention exhibits a solids content of equal to or less than 70 wt %. All individual values and ranges from equal to or less than 70 wt % are included and disclosed herein. For example, the solids content of the dispersion may range from 25 to 70 wt %, or in the alternative, from 30 to 65 wt %, or in the alternative, from 40 to 70 w %.

The dispersion used in the invention exhibits a pH of 8 or greater. All values from 8 or greater are included and disclosed herein. For example, the pH of the dispersion may be from 8 to 10, or in the alternative, from 8 to 11.

Forming the Dispersion

The dispersion may be prepared in an extrusion process, e.g., as discussed in U.S. Pat. No. 8,318,257, the disclosure of which is incorporated herein by reference.

Any melt-kneading means known in the art may be used. In some embodiments, a kneader, a BANBURY mixer, single-screw extruder or a multi-screw extruder is used. A process for producing the dispersions in accordance with the present invention is not particularly limited. One preferred process, for example, is a process comprising melt-kneading the above-mentioned components according to U.S. Pat. Nos. 5,756,659 and 6,455,636.

Figure 1:
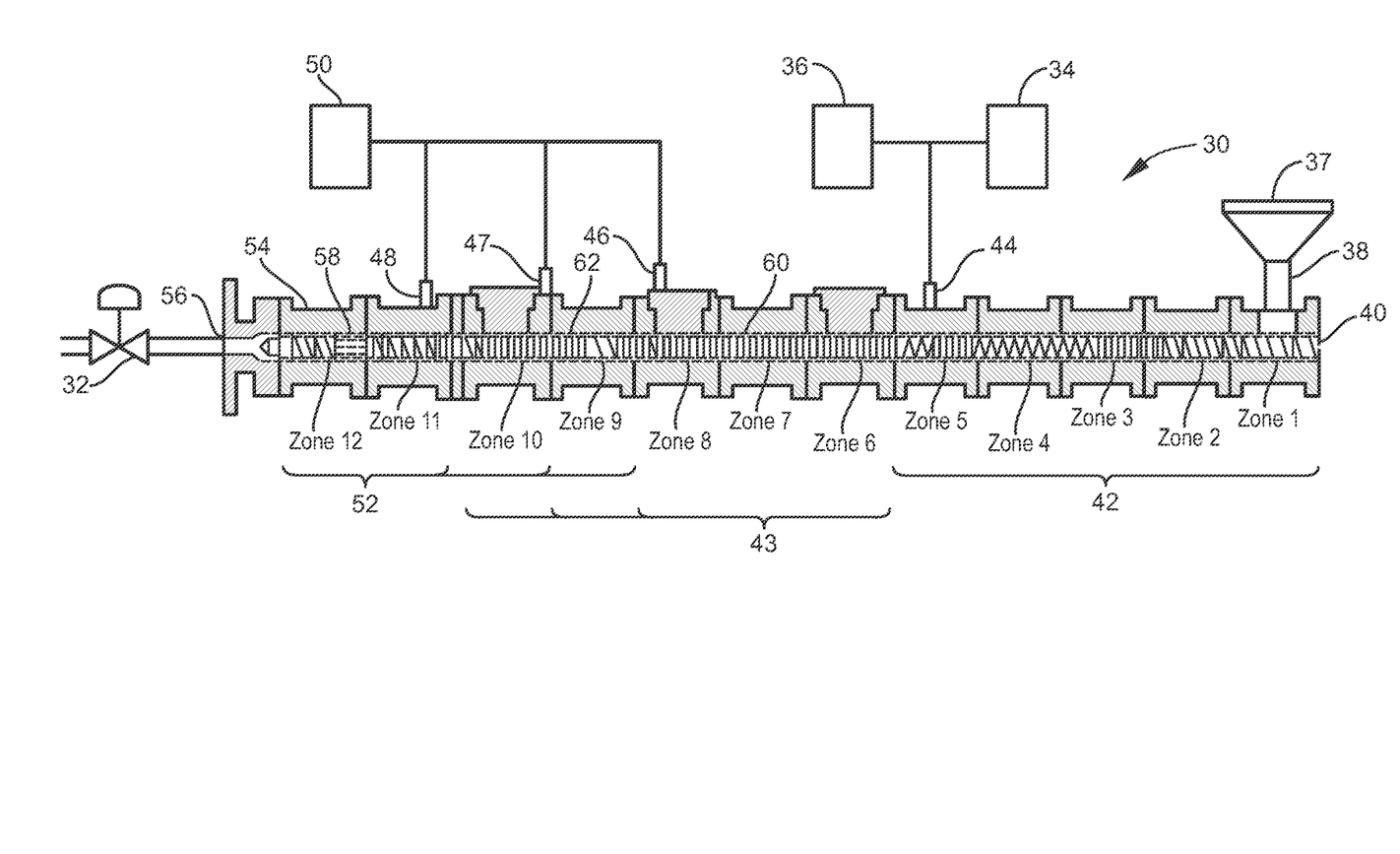
FIG. 1 is a schematic representation of a typical melt-extrusion apparatus used to prepare the dispersions used in embodiments of the invention.

FIG. 1 illustrates an exemplary a schematic diagram of an extrusion apparatus for manufacturing an aqueous polymer dispersion, as used in the invention. An extruder 30, such as a twin screw extruder, may be coupled to a control valve 32, for controlling extruder discharge pressure. In some embodiment, control valve 32 may be a V-ball control valve. In other embodiments, control valve 32 may be a micro-notch V-ball control valve. Neutralizing agent reservoir 34 and an initial dispersion medium reservoir 36, each of which includes a pump (not shown), may also be provided. Desired amounts of neutralizing agent and initial dispersion medium, herein water, are provided from the neutralizing agent reservoir 34 and the initial water reservoir 36, respectively.

Polymer resin(s), in the form of pellets, powder, or flakes, for example, may be fed from the feeder 37 to an inlet 38 of the extruder 30. The dispersant is typically added to the extruder through and along with the resin but may be provided separately to the twin screw extruder 30. The polymer and dispersant are then melted, mixed, and conveyed by screws 40 in mix and convey zone 42. Alternatively, the dispersant may be delivered in liquid form by way of any appropriate liquid injector or pump.

The resin melt is then delivered from the mix and convey zone to a high internal phase emulsion creation zone 43 (referred to herein as the "HIPE zone") of the extruder. In the HIPE zone, an initial amount of water and neutralizing agent from the reservoirs 34 and 36 is added through inlet 44.

In the HIPE zone 43, the dispersion particle size is formed, based upon the interfacial chemistry of the mixture components, the mass transfer of the neutralizing agent, and the distributive and dispersive mixing imparted by the screws 40, including the stress, strain and passage frequency.

The emulsified mixture may be further diluted with additional water via one or more of inlet 46, 47, 48 from reservoir 50 in dilution zone 52 of the extruder 30. Typically, the dispersion is diluted to at least 30 weight percent water in dilution zone 52. In dilution zone 52, the packing fraction of the dispersion particles and the viscosity of the mixture are reduced. For example, the viscosity may be reduced from a magnitude of about $10^6$ to about $10^2$ centipoise ("cP").

A cooling zone 54 may be located toward the end of screw 40, near the outlet of extruder 30. Cooling zone 54, providing heat exchange between the dispersion mixture and a cooling medium, not shown, may be used to cool the dispersion mixture to a temperature below that of the boiling point of the dispersion medium. For example, where the dispersion medium is water, the dispersion mixture may be cooled to a temperature below about 100° C. The reduction in dispersion mixture temperature may allow further processing of the mixture without unwanted loss of dispersion medium through evaporation.

The cooled dispersion may then exit extruder 30 via outlet 56. Outlet 56 may be coupled to control valve 32, as described above, to maintain extruder discharge pressure control.

Regarding screws 40 and the internals of extruder 30, one or more rotating restriction orifices 58 may be located along screw 40 in some embodiments. In addition to control valve 32, rotating restriction orifices 58 may improve stability of the dispersion forming process. In other embodiments, non-rotating restriction orifices, not shown, may be used.

Screws 40 may also include high-mixing kneading disks 60 in some embodiments. In addition to the high-mixing kneading disks 60 described above, embodiments of the extrusion apparatus disclosed herein may also include low free volume kneading disks 62, which may minimize the volume weighted particle size distribution of dispersions formed using extruder 30.

In other embodiments of the extrusion apparatus, the reverse elements may be removed, preventing unwanted back mixing. Additionally, the melt seal may be located directly upstream of the HIPE zone in some embodiments.

As illustrated in FIG. 1, HIPE zone 43 may be variable in length. Depending upon the feed composition (such as the polymer, dispersing agent, neutralizing agent, etc.), it may be desirable to have a longer or a shorter HIPE zone. Multiple dispersion medium injection points 46, 47, 48 may be provided to allow the HIPE zone to be extended or shortened as needed. As the particle size of the dispersed polymer particles is formed in the HIPE zone, adequate mixing should be provided to develop the desired particle size. Having a variable length for the HIPE zone may allow for a broader range of polymers to be processed in a single extruder, providing for process flexibility, among other benefits.

Dispersions of the present invention are characterized in having an average particle size from about 0.1 micron to about 5.0 micron. In other embodiments, dispersions have an average particle size from about 0.5 micron to about 2.7 micron. In other embodiments, from about 0.8 micron to about 1.2 micron. By "average particle size", the present invention means the volume-mean particle size. In order to measure the particle size, laser-diffraction techniques may be employed for example. A particle size in this description refers to the diameter of the polymer in the dispersion. For polymer particles that are not spherical, the diameter of the particle is the average of the long and short axes of the particle.

Additional Coating Composition Components

Generally, the coating composition comprises from 65 to 99 wt % dispersion. All individual values and subranges from 65 to 99 wt % are included and disclosed herein. For example, the amount of the dispersion in the coating composition can range from a lower limit of 65, 70, 75, 80, 85, 90, or 95 to an upper limit of 80, 85, 90, 95, or 99 wt %. The amount of dispersion in the coating composition may range from 65 to 99 wt %, or in the alternative, from 80 to 99 wt %, or in the alternative, from 80 to 95 wt %, or in the alternative, from 70 to 99 wt %. The foregoing examples are non-limiting as the amount of dispersion may change depending upon the viscosity desired for a given application technique.

The coating composition further comprises one or more rheology modifiers and optionally one or more second neutralizing agents. One skilled in the art would understand that the amounts of the rheology modifiers and neutralizing agents may be coordinated so as to achieve a viscosity appropriate for application while maintaining a basic pH, as is appropriate to keep the dispersion stable. The use of and/or amount of rheology modifier may further depend upon other components to the coating composition. For example, fillers may be included in the coating composition; such fillers may impact viscosity and therefore, impact the amount of rheology modifier needed.

In one embodiment, the second neutralizing agent is from 0 to 15% by volume of the total coating composition volume. All individual values and ranges from 0 to 15% by volume are included and disclosed herein; for example, the amount of second neutralizing agent can range from a lower limit of 0, 3, 6, 9, or 12% by volume to an upper limit of 4, 7, 10, 13 or 15% by volume. For example, the amount of second neutralizing agent can be from 0 to 15% by volume, or in the alternative, from 5 to 15% by volume, or in the alternative, from 0 to 5% by volume, or in the alternative, from 2 to 10% by volume. Any neutralizing agent known in the art may be used as the second neutralizing agent, including organic and/or inorganic bases, as discussed previously in connection with the dispersion.

Any rheology modifier known in the art may be used. In particular embodiments, the rheology modifier may be selected from the group consisting of carboxylic acid polymers, cellulosic compounds, crosslinked polyacrylate polymers, polyacrylamide polymers, polysaccharides, and gums. In one embodiment, the rheology modifier is selected from the ACRYSOL line of rheology modifiers (available from The Dow Chemical Company).

The coating composition may further include one or more additives selected from the group consisting of flame retardants, antiblocking agents, solvents, stabilizers, and pigments. Any such additives known in the art may be used. Exemplary flame retardants include phosphonate esters, phosphate esters, halogenated phosphonate esters or combinations thereof. Other flame retardants such as zeolites, hydrated phosphates, alkali silicates, borates, borosilicates, melamine, graphite, graphene, mica, vermiculites, alumina, aluminum hydroxide, perlites, antimony trioxide, polyphosphate, melamine can also be used.

Halogen free flame retardants, such as diethylethane phosphonate (DEEP); triethylphosphate (TEP); dimethylpropylphosphate (DMPP); diphenylcreysl phosphate (DCP) can also be used.

Coating Composition Formation and Coating Application

Coating composition components may be blended using any known method. The viscosity and pH of the coating composition may be adjusted as needed. Alternatively, the viscosity may be adjusted following delivery to an end user, as may be appropriate for the chosen coating method.

The coating composition may be applied to any woven or nonwoven fabric. Non-limiting examples of suitable fabrics include those made from synthetic or natural fibers, such as polyesters, polyimides, polyethylenes, polypropylenes, polyester-cotton blends, glass fibers, and polyamides. In a particular embodiment, the fabric is a polyester and/or nylon-66.

The coating compositions may be applied according to known techniques to the fabric. Such techniques include knife coating, roll coating, dip coating, flow coating, squeeze coating, and spray coating. Knife coating methods includes knife-over-air, knife-over-roll, knife-over-foam, and knife-over-gap table methods. Roll coating methods includes single-roll, double-roll, multi-roll, reverse roll, gravure roll, and transfer-roll coating methods. In a particular embodiment, the coating composition is applied by a knife-over-air or knife-over-roller coating method.

The coating composition may be applied to the fabric at a coat weight prior to curing of from 20 to 150 $g/m^2$. All values and subranges from 20 to 150 $g/m^2$ are included and disclosed herein. For example, the coat weight prior to curing may range from a lower limit of 20, 40, 60, 80, 100, 120 or 150 $g/m^2$ to an upper limit of 50, 70, 90, 110, 130 or 150 $g/m^2$. For example, the wet coating weight may range from 20 to 150, or in the alternative, from 50 to 150, or in the alternative, from 70 to 120 $g/m^2$.

The viscosity of the coating composition may be adjusted according to the desired application technique. In one embodiment, the viscosity of the coating composition is adjusted to from 1000 to 4000 cPs. All individual values and subranges from 1000 to 4000 cPs are included herein; for example, the viscosity may be adjusted to a range having a lower limit of 1000, 1500, 2000, 2500 or 3000 cPs to an upper limit of 2250, 2750, 3250, or 4000 cPs. For example, the viscosity of the coating composition may be adjusted to a range of from 1000 to 4000 cPs, or in the alternative, from 1000 to 3000 cPs, or in the alternative, from 2000 to 4000 cPs, or in the alternative, from 1750 to 3750 cPs.

Following coating composition application, the coating is cured by removing the water from the coating composition and melting the polymeric components of the coating composition to form a polymer film. In a particular embodiment, the coated fabric is cured by ambient exposure to 190° C. for a period of 5 minutes or, in the alternative, for a sufficient time to remove the water. In another embodiment, the coating is cured by ambient exposure to an increasing temperature ramp ranging from about 24° C. to 200° C. All individual values and subranges from 24° C. to 200° C. are included and disclosed herein. For example, the temperature ramp may range from 24 to 200° C., or in the alternative, from 30 to 155° C., or in the alternative, from 27 to 160° C. The upper limit will be dependent upon the melting point of the solid components of the dispersion, and therefore, the limits of 24° C. to 200° C. are merely illustrative and not restrictive. The temperature ramp may be continuous or discontinuous. That is, the change in temperature may be gradual or the temperature may be changed discontinuously in different zones. Further, one skilled in the art would readily understand that the temperature needed to drive off the water or to melt the polymeric dispersion components is impacted by pressure. For example, under sufficiently low pressure, the water may be removed without raising the temperature above ambient temperature.

Following removal of water and formation of the coating film, the coat weight may range from 20 to 50 $g/m^2$. All values and subranges from 20 to 50 $g/m^2$ are included and disclosed herein. For example, the coat weight after curing may range from a lower limit of 20, 22, 24, 26, 28, 30, or 32 $g/m^2$ to an upper limit of 27, 29, 31, 33, 40 or 50 $g/m^2$. For example, the cured coating weight may range from 20 to 50, or in the alternative, from 21 to 28, or in the alternative, from 20 to 33, or in the alternative, from 28 to 34 $g/m^2$.

Following curing, one or more additional coatings may optionally be applied to the coated fabric. Such additional coatings may include those known in the art to improve or impart properties, such as to lower the coefficient of friction, increase block resistance, and increase scrub resistance. In one embodiment, an additional coating comprising a polyorganosiloxane and/or polymer silicone material is added to the inventive coated fabric.

End-Uses and Properties

The coating composition of the present invention may be used, for example, in those applications requiring retention of air and/or other gas pressure. Non-limiting examples of such applications include vehicle air bags, aircraft emergency chutes.

The coated fabric of the invention exhibits a pressure retention of greater than or equal to 95% of an applied pressure of 200 kPa for a period of equal to or greater than 15 seconds. All individual values from greater than or equal to 95% and equal to or greater than 15 seconds are included herein. For example, the coated fabric may retain 95%, 96%, 97%, 98%, or 99% of an applied pressure of 200 kPa, for a period of 15, 20, 25, 30 or 45 seconds.

In one embodiment, the present invention provides a coated fabric comprising: a woven or nonwoven substrate; and a coating derived from the inventive coating composition. In another embodiment, the present invention provides an article comprising the coated fabric. Non-limiting examples of such articles include airbags for use in motor vehicles and emergency chutes.

Air bags are generally formed from a woven or knitted fabric made of synthetic fiber, for example of polyamide such as nylon-6,6 or polyester, coated on at least one of its sides. Air bags may be made of flat fabric pieces which are coated and then sewn together to provide sufficient mechanical strength, or may be woven in one piece with integrally woven seams. Sewn air bags are generally assembled with the coated fabric surface at the inside of the air bag. One piece woven air bags are coated on the outside of the air bag. The present invention provides any for of airbag which comprises the inventive coated fabric. In one embodiment, the invention provides a side impact airbag. In another embodiment, the invention provides a driver or passenger front airbag.

As used herein, the term "remains deployed" signifies retention of at least 50% of the initial deployment pressure of the airbag.

Examples

The following examples illustrate the present invention but are not intended to limit the scope of the invention.

Dispersion Examples

Inventive dispersion 1-6 and Comparative dispersion A were prepared according to the following process.

The dispersions were prepared using a 12 zone 25 mm BERSTORFF. The polyolefin resin was delivered to the system as a pellet through a large Schenk feeder that dropped into the feed throat. The compatibilizer was delivered using a KQX K-tron feeder that also dropped into the feed throat. The dispersant was delivered to the system as a liquid via a 1000D ISCO syringe pump through an injector that was located in Zone 5A or as a solid delivered using a KQX K-tron feeder that also dropped into the feed throat. The initial water was delivered via a 500D ISCO pump through an injector that was placed in Zone 4B. Base was added to provide 100-140% neutralization and delivered via a 500D ISCO pump that was piped in with the initial water. Base was also added through Zone 4B. Finally, the dilution water was delivered via a large Hydracell pump through an injector that was placed in Zone 8A. Table 1 lists the specific components for each of the Inventive and Comparative Dispersions and the wt % solids and volume average particle size for each of the dispersions. Table II provides information on dispersion and coating composition components.

TABLE I

| Dispersion Composition, wt % | Inv. Ex. 1 | Inv. Ex. 2 | Inv. Ex. 3 | Comp. Ex. A | Inv. Ex. 4 | Inv. Ex. 5 | Inv. Ex. 6 |
|---|---|---|---|---|---|---|---|
| INFUSE 9807 | 86 | | | | | | |
| INFUSE 9817 | | 89 | | | | | |
| INFUSE 9500 | | | 82.5 | 75 | | | |
| DMDA 8940 | | | | | 42 | | |
| DOWLEX 2517 | | | | | | 70 | |
| VERSIFY 4301 | | | | | | | 82.3 |
| Honeywell AC 575 | 7 | | | | | | |
| AMPLIFY Gr-204 | | | | | 19 | | |
| PRIMACOR 5980i | | | | | 32 | 30 | |
| UNICID 350 | 7 | | | | | | |
| LICOCENE 4351 | | 7 | 10 | 10 | 7 | | |
| Oleic Acid | | 4 | | | | | 7 |
| BHX-10075 | | | | | | | 10.7 |
| Acrylic Dispersant | | | 7.5 | 15 | | | |
| Neutralization to 140% | DMEA | KOH (30% in H$_2$O) | DMEA | DMEA | DMEA | DMEA | KOH (30% in H$_2$O) |
| Water | | | | | | | |
| Total | 100 | 100 | 100 | 100 | 100 | 100 | 100 |
| Property | | | | | | | |
| Solids % | 50 | 49 | 46 | 46 | 50 | 49 | 48 |
| Particle Size (Vmean, microns) | 0.3 | 0.5 | 1.3 | 3.2 | 0.35 | 1.1 | 1.5 |

TABLE II

| Tradename | Composition | Source | Addtl Properties |
|---|---|---|---|
| INFUSE 9807 | ethylene/octene block copolymer | Dow | Density = 0.866 g/cm$^3$, I$_2$ = 15 g/10 min Melting temperature (Tm) = 118° C. |
| INFUSE 9817 | ethylene/octene block copolymer | Dow | Density = 0.877 g/cm$^3$ I$_2$ = 15 g/10 min, Melting temperature (Tm) = 120° C. |
| INFUSE 9500 | ethylene/octene block copolymer | Dow | Density = 0.877 g/cm$^3$ I$_2$ = 5 g/10 min Melting temperature (Tm) = 122° C. |
| DMDA 8940 | high density polyethylene | Dow | Density = 0.951 g/cm$^3$ I$_2$ = 44 g/10 min Melting temperature (Tm) = 128° C. |
| DOWLEX 2517 | linear low density PE | Dow | Density = 0.917 g/cm$^3$ I$_2$ = 25 g/10 min Melting temperature (Tm) = 124° C. |
| VERSIFY 4301 | propylene-ethylene copolymers | Dow | Density = 0.868 g/cm$^3$ Melt Flow Rate, (2.16 kg @ 230° C.) = 25 g/10 min Vicat Softening Point = 51° C. |
| Honeywell AC 575 | Maleated polyolefin | Honeywell | |
| AMPLIFY GR-204 | Maleic anhydride modified PE | Dow | Density = 0.953 g/cm$^3$ I$_2$ = 12 g/10 min |
| PRIMACOR 5980i | Ethylene Acrylic Acid Copolymer | Dow | Density = 0.958 g/cm$^3$ I$_2$ = 300 g/10 min Vicat Softening Point = 42° C. |
| UNICID 350 | Long chain, linear carboxylic acid | Baker Hughes | |
| LICOCENE 4351 | Maleic anhydride grafted PE wax | Clariant | Acid Value (measured by QM-AA-351a) = 42-49 mg KOH/g Density (measured by ISO 1183 @ 23° C.) = 0.98-1.0 g/cm$^3$ |
| BHX-10075 | maleic anhydride grafted Poly(propylene-co-hexene) | Baker Petrolite | Acid Value = 100 KOH/g, Tm = 80° C. |

Ammonium hydroxide (NH$_4$OH), dimethylethanolamine (DMEA), oleic acid and KOH (30% in H$_2$O) were supplied by Fisher Scientific. The acrylic dispersant is a copolymer of 62 wt % ethylhexylacrylate, 2 wt % methylmethacrylate, and 36 wt % methylmethacrylate, having an acid value of 232 KOH/g and 50 wt % solids (see above for synthesis).

Inventive Coating Compositions 1-6 and Comparative Coating Composition A

Coating composition were prepared by adding 20 g of dispersion to a speed mixer cup. 0.08 g of NH$_4$OH (ammonium hydroxide) 28% in water was added and mixed at 2000 rpm for 30 seconds. 0.15 g of Dow ACRYSOL ASE-60 (acrylic emulsion copolymer) was added and mixed at 2000 rpm for 30 seconds. The formulation was allowed to sit for 30 minutes before coating. Viscosity was measured with a Brookfield viscometer at 20 rpms. Table III lists the coating composition components.

TABLE III

| Coating Composition, wt % | Inv. Ex. 1 | Inv. Ex. 2 | Inv. Ex. 3 | Comp. Ex. A | Inv. Ex. 4 | Inv. Ex. 5 | Inv. Ex. 6 |
|---|---|---|---|---|---|---|---|
| Disp Ex 1 | 98.863 | | | | | | |
| Disp Ex 2 | | 98.863 | | | | | |
| Disp Ex 3 | | | 98.863 | | | | |
| Comp Disp Ex. A | | | | 98.863 | | | |
| Disp Ex 4 | | | | | 98.863 | | |
| Disp Ex 5 | | | | | | 98.863 | |
| Disp Ex 6 | | | | | | | 98.863 |
| NH$_4$OH (28% in water) | 0.395 | 0.395 | 0.395 | 0.395 | 0.395 | 0.395 | 0.395 |
| Dow ACRYSOL ASE-60 (diluted 10% in H2O) | 0.742 | 0.742 | 0.742 | 0.742 | 0.742 | 0.742 | 0.742 |
| Viscosity, Brookfield, 20 rpms, cp | 2400 | 4600 | 4000 | 2000 | 3200 | 3900 | 3500 |

Coated Fabric Preparation

Lab scale samples: Small samples of airbag fabric comprised of Hyosung 470 Dtex polyester yarn woven into fabric by Global Safety Textiles were cut into 5"×5" squares. Fabric samples were held down on a flat glass clipboard. 3 mL of coating was evenly pipetted across the top of the fabric. Each of inventive coating compositions 1-6 and comparative coating composition A were used and the coated fabric examples have corresponding designations. A size 28 wire round draw down rod from Gardco was used to spread the coating targeting a wet film thickness of 66.7 microns. Samples were then placed in a 190 C oven for 5 minutes. Upon drying, samples were found to have a coating of 22-41 grams per square meter. This was measured by comparing the weight of an uncoated fabric sample versus a coated fabric of the same size. Table IV lists the properties of the coated fabrics.

TABLE IV

| Coated Airbag Fabric (Lab scale samples) | Ex. 1 | Ex. 2 | Ex. 3 | Comp Ex. A | Ex. 4 | Ex. 5 | Ex. 6 |
|---|---|---|---|---|---|---|---|
| Coat Weight (g/m$^2$) | 32 | 30 | 41 | 22 | 30 | 41 | 28 |
| Permittivity (pressure drop after 30 sec starting at 200 kPa +/− 3 kPa) | <1 | <1 | <1 | 30 | 3 | 6 | 3 |
| Flammability rate, mm/min | 36/SE* | 53/SE | 76/SE | 74 | 83/SE | 110 | 77/SE |

*SE = self-extinguishing

Pilot scale continuous coating: The continuous pilot coater consists of a roll to roll coater with knife over air, knife over roll, and knife over slot capabilities. The examples were generated with utilizing a knife over air configuration using a 0.5" radius J-blade. Fabric is tensioned with a clutch tension of 22.5 psi and the rewind tension set between 90-95 psi. Blade depth and fabric tension were adjusted to target a dry coating weight in the range of 35+/−5 g/m$^2$. The wet one piece woven fabric is pulled through the oven at rates of 0.5-4 meters/minute through two electric forced air drying ovens. Temperature setting of each oven can be independently controlled, and the dwell time can be varied by the rate that the fabric is pulled through the oven. Coat weight was measured using Inventive Coating Composition 2, and uniform film formation were verified via SEM. The pilot scale sample exhibited a cured coat weight of 33 g/m$^2$, a pressure drop of <1 kPa, and a flammability rate of 52 mm/min and was self-extinguishing.

A roll of miniature PET one piece woven airbags was run through the coating process on the continuous coater using Inventive Coating Composition 2. The airbag roll was coated, run through the drying ovens containing 2 zones, with a set point of 110° C. and 150° C., at 3 meters/minute. The airbag was coated on the same side a second time to achieve a coat weight of 44 g/m$^2$. The airbag was then coated on the other side twice to achieve a coat weight of 44 g/m$^2$ on each side. The coated airbag is placed in the deployment rig, and the end is sealed by tape. The bag is then pressurized, targeting an initial pressure of 70 kPa. The loss in pressure over time is measured. Initial pressure: 76.86 kPa. Pressure at 6 seconds: 66.76 kPa; at 12 seconds: 52.4. Target <50% pressure drop at 6 seconds.

Test Methods

Test methods include the following:

Average particle size diameter was measured by a Beckman Coulter LS230 particle size analyzer with a Small Volume Module used as the sample delivery system. The software version utilized is Version 3.29. Hardware and software can be obtained from Beckman Coulter Inc., Miami, Florida.

The analysis conditions for all measurements utilizes a fluid refractive index of 1.332, a sample real refractive index of 1.5, and a sample imaginary refractive index of 0.0. The extended optical model is not employed. The polarization intensity differential scattering (PIDS) option is activated and used to generate the particle size information. The average particle size diameter is measured and reported in μm.

Polymer density is measured in accordance with ASTM D 792.

Polymer melting temperature is measured by DSC according to ASTM D3418.

Vicat Softening Point is measured in accordance with ASTM D1525.

Melt index ($I_2$) of an ethylene-based polymer is measured in accordance with ASTM D-1238-04, condition 190° C./2.16 kg. Melt index ($I_5$) of an ethylene-based polymer is measured in accordance with ASTM D-1238-04, condition 190° C./5.0 kg. Melt index ($I_{10}$) of an ethylene-based polymer is measured in accordance with ASTM D-1238-04, condition 190° C./10.0 kg. High load melt index (I21) of an ethylene-based polymer is measured in accordance with ASTM D-1238-04, condition 190° C./21.0 kg. For propylene-based polymers, the melt flow rate (MFR) is measured in accordance with ASTM D-1238-04, condition 230° C./2.16 kg.

Polymer molecular weights are determined by Gel Permeation Chromatography (GPC) as follows. The chromatographic system used is a Polymer Laboratories Model PL-210. The column and carousel compartments were operated at 145° C. Four Polymer Laboratories 20-um Mixed-A LS columns were used, with a solvent of 1,2,4 Trichlorobenzene (TCB). The samples were prepared at a concentration of 0.1 g of polymer in 50 ml of solvent. The solvent contained 200 ppm of the antioxidant butylated hydroxytoluene (BHT). Samples were prepared by agitating lightly for 1-2 hours at 160° C. The injection volume was 200 microliters and the flow rate was 1.0 ml/min. Calibration of the GPC column set was performed with narrow molecular weight distribution polystyrene standards purchased from Varian Inc. (previously Polymer Laboratories). The polystyrene standard peak molecular weights were converted to polyethylene molecular weights using Williams, T., and I. M. Ward, "The Construction of Polyethylene Calibration Curve for Gel Permeation Chromatography Using Polystyrene Fractions", J. Polym. Sci. Polym. Lett., 6, 631 (1968): $M_{polyethylene}=0.431(M_{polystyrene})$.

Polyethylene equivalent molecular weight calculations are performed using Viscotek TriSEC software Version 3.0.

Dispersion/Emulsion pH is measured using a handheld pH meter from Denver Instruments/Sartorius.

Acid value is calculated as the mass of potassium hydroxide (KOH) in milligrams that is required to neutralize one gram of component.

Viscosity was measured with a Brookfield viscometer at 20 rpms.

Flammability was measured following ISO 3795 and scored based on EASC standard 9904 0180.

Pressure retention was tested using a variation of ASTM d737 and ISO 9237 where only the drop in pressure is measured. The system involves the use of a 10 L pressure tank that can be charged to a targeted pressure of 200 kPa. A 4"×4" sample is cut from the coated fabric sample, and positioned opposite the pressurized tank. The sample is placed overtop a 3.75" diameter gasket that is used to create a seal preventing air from leaking between fabric and the metal plates. The second metal plate is aligned overtop of the lower platen, and the system is clamped. The jig is pressurized with 200 kPa+/−10 kPa of air directed to the non-coated side of the coated fabric. With the coated fabric sample as the only leak point, the pressure drop over the duration of the 30 second test time was monitored. The value at the end of the test time is recorded and compared to the starting pressure. A Swagelok CF-3M valve is opened to allow pressure to be applied to the coated fabric and a ROSEMOUNT™ 3051 Pressure Transmitter with HART® Protocol is used to record the pressure. The pressure information is captured via LabView software.

Deployment pressure retention uses a 10 L pressure tank that is charged to a targeted pressure of 145 kPa. A miniature airbag that has been coated is connected to 1" diameter outlet pipe, and upon the opening a valve, the bag is inflated to 70 kPa (+/−5 kPa) in <50 milliseconds. The rate of decay of the pressure is measured with a ROSEMOUNT™ 3051 Pressure Transmitter with HART® Protocol. Pressure decay information is captured via LabView software.

Cured coat weight was measured by comparing the weight of an uncoated fabric sample vs a coated fabric of the same size. Wet coat weight can be measured the same way, or through spectroscopic or optical interference techniques such as rugged optical interference (ROI) instruments from Specimetrix.

The present invention may be embodied in other forms without departing from the spirit and the essential attributes thereof, and, accordingly, reference should be made to the appended claims, rather than to the foregoing specification, as indicating the scope of the invention.

We claim:

1. An airbag comprising a coated fabric comprising:
   (1) a woven or nonwoven substrate comprising polyester or polyamide;
   (2) a coating derived from a coating composition which comprises (1) a dispersion comprising a melt blended product of:
      (a) from 50 to 95 wt %, based on the total solids weight of the dispersion, of one or more olefinic base polymers;
      (b) from 2 to 40 wt %, based on the total solids weight of the dispersion, of one or more dispersants;
      (c) from 0 to 15 wt %, based on the total solids weight of the dispersion, of one or more compatibilizers;
      (d) water; and
      (e) optionally, base to neutralize the one or more dispersants from 100 to 140% of an acid value of the one or more dispersants; wherein the dispersion exhibits an average volume mean particle size diameter of less than or equal to 2 microns, a solids content of equal to or less than 70 wt %, and a pH of 8 or greater; (2) one or more rheology modifiers; and (3) optionally, one or more neutralizing agents such that the coating composition has a pH of greater than 7; wherein the coating is applied to at least one surface of the substrate at a total coating weight of from 20 to 50 g/m2; and
   wherein the coated fabric exhibits a pressure retention of greater than or equal to 95% of an applied pressure of 200 kPa for a period of equal to or greater than 15 seconds.

2. The airbag of claim 1, wherein the coated fabric exhibits a pressure retention of greater than or equal to 98% of an applied pressure of 200 kPa for a period of equal to or greater than 30 seconds.

3. The airbag of claim 1, wherein the airbag is formed from a unitary portion of the coated fabric.

4. The airbag of claim 1, wherein the airbag comprises multiple portions of the coated fabric sewn together to form the airbag.

5. The airbag of claim 1, wherein the airbag is a side impact airbag.

6. The airbag of claim 1, wherein the airbag is a driver or passenger front airbag.

7. The airbag of claim 1, wherein the airbag remains deployed for a period of at least 12 seconds.

8. The airbag of claim 1, wherein the airbag remains deployed for a period of at least 6 seconds.

9. The airbag of claim 1, wherein the one or more olefinic base polymers comprise an ethylene-alpha olefin copolymer.

10. The airbag of claim 9, wherein the ethylene-alpha olefin is an ethylene-alpha olefin multi-block copolymer.

11. The air bag of claim 1, wherein the coated fabric is self-extinguishing.

12. A coated fabric comprising:
   (1) a woven or nonwoven substrate comprising polyester or polyamide;
   (2) a coating derived from a coating composition which comprises (1) a dispersion comprising a melt blended product of:

(a) from 50 to 95 wt %, based on the total solids weight of the dispersion, of one or more olefinic base polymers;
(b) from 2 to 40 wt %, based on the total solids weight of the dispersion, of one or more dispersants;
(c) from 0 to 15 wt %, based on the total solids weight of the dispersion, of one or more compatibilizers;
(d) water; and
(e) optionally, base to neutralize the one or more dispersants from 100 to 140% of an acid value of the one or more dispersants; wherein the dispersion exhibits an average volume mean particle size diameter of less than or equal to 2 microns, a solids content of equal to or less than 70 wt %, and a pH of 8 or greater; (2) one or more rheology modifiers; and (3) optionally, one or more neutralizing agents such that the coating composition has a pH of greater than 7; wherein the coating is applied to at least one surface of the substrate at a total coating weight of from 20 to 50 g/m2.

13. The coated fabric of claim 12, wherein the coated fabric exhibits a pressure retention of greater than or equal to 95% of an applied pressure of 200 kPa for a period of equal to or greater than 15 seconds.

14. The coated fabric of claim 13, wherein the coated fabric is self-extinguishing.

\* \* \* \* \*